United States Patent
Adachi et al.

(10) Patent No.: US 9,827,682 B2
(45) Date of Patent: Nov. 28, 2017

(54) JOINT STRUCTURE FOR ROBOT INCLUDING MOTOR FOR CAUSING ARM TO BE SWUNG

(71) Applicant: FANUC CORPORATION, Yamanashi (JP)

(72) Inventors: Satoshi Adachi, Yamanashi (JP); Satoshi Kinoshita, Yamanashi (JP); Yasuyoshi Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/076,671

(22) Filed: Mar. 22, 2016

(65) Prior Publication Data
US 2016/0288321 A1 Oct. 6, 2016

(30) Foreign Application Priority Data

Apr. 2, 2015 (JP) ................................. 2015-076255

(51) Int. Cl.
*B25J 17/00* (2006.01)
*B25J 9/10* (2006.01)

(52) U.S. Cl.
CPC ............... *B25J 17/00* (2013.01); *B25J 9/108* (2013.01)

(58) Field of Classification Search
CPC .................................. B25J 9/108; B25J 17/00
USPC ......... 74/490.03, 490.05, 490.06; 901/28, 29
See application file for complete search history.

(56) References Cited

U.S. PATENT DOCUMENTS

| | | | | |
|---|---|---|---|---|
| 3,883,900 A | * | 5/1975 | Jerard | A61F 2/58 623/25 |
| 4,651,591 A | * | 3/1987 | Wurst | B25J 9/08 475/1 |
| 4,697,978 A | * | 10/1987 | Tada | B25J 19/0079 310/86 |
| 4,899,637 A | * | 2/1990 | Caruso | B25J 9/148 137/580 |
| 4,949,586 A | * | 8/1990 | Akagawa | B25J 17/0241 74/96 |
| 5,231,889 A | * | 8/1993 | Lee | B25J 17/025 74/479.01 |
| 5,375,480 A | * | 12/1994 | Nihei | B25J 19/0029 74/490.02 |
| 5,523,662 A | * | 6/1996 | Goldenberg | B25J 9/06 318/568.11 |

(Continued)

FOREIGN PATENT DOCUMENTS

| | | |
|---|---|---|
| CN | 104325465 A | 2/2015 |
| JP | 63-50155 | * 10/1988 |
| JP | 8-141968 A | 6/1996 |

(Continued)

*Primary Examiner* — William C Joyce
(74) *Attorney, Agent, or Firm* — Hauptman Ham, LLP

(57) ABSTRACT

A motor is fixed to one wall portion of an arm in an inner space of the arm. A hollow bearing is inserted in a first opening portion formed in other wall portion of the arm. A hollow shaft portion is removably fixed to a housing and supports an inner ring of the hollowing bearing. A hollow portion of the hollow shaft portion is formed to be smaller than the motor. The first opening portion is formed such that the motor is allowed to pass therethrough. A wall portion of the housing that forms support portions is formed with a second opening portion that allows the hollow bearing and the motor to pass therethrough.

6 Claims, 5 Drawing Sheets

(56) References Cited

U.S. PATENT DOCUMENTS 5,732,599 A * 3/1998 Iriyama ................ B25J 17/0241
                                                    74/490.02
7,013,750 B1 * 3/2006 Kazami ..................... B25J 9/08
                                                    74/490.03

FOREIGN PATENT DOCUMENTS

| JP | 2009-184049 A | 8/2009 |
| JP | 2010-151269 A | 7/2010 |
| JP | 2015-74036 A  | 4/2015 |

* cited by examiner

JOINT STRUCTURE FOR ROBOT INCLUDING MOTOR FOR CAUSING ARM TO BE SWUNG

RELATED APPLICATIONS

The present application claims priority to Japanese Patent Application Number 2015-076255, filed Apr. 2, 2015, the disclosure of which is hereby incorporated by reference herein in its entirety.

BACKGROUND OF THE INVENTION

1. Field of the Invention

The present invention relates to a joint structure for a robot, which includes a hollow-structured arm, a housing that forms support portions for swingably supporting the arm, and a motor that causes the arm to be swung.

2. Description of the Related Art

Known in the art is a joint structure for a robot in which a pair of support portions disposed in opposing relationship to each other swingably support an arm with the arm being held therebetween, or a so-called both-end support type joint structure.

Such a joint structure includes a hollow-structure arm, and a U-shaped housing that forms a pair of support portions disposed in opposing relationship to each other with one end of the arm held therebetween, and swingably supports the arm by the pair of support portions as disclosed in Japanese Patent Laid-open Publication No. H08-141968.

FIG. 3 is a sectional view of a prior-art joint structure for a robot. As illustrated in FIG. 3, a U-shaped housing 10 forms a pair of support portions A and B disposed in opposing relationship to each other with an arm 14 being held therebetween, and supports the arm 14 swingably about a swing axis X by the pair of support portions. In each inner space of the housing 10 and the arm 14 is accommodated a rotating device that causes the arm 14 to be swung. As the rotating device, use is made of a motor 15 and a speed reducer 17 such as illustrated in FIG. 3. As illustrated in FIG. 3, each axis of rotation of the motor 15 and the speed reducer 17 is located on an axis same as the swing axis X.

As illustrated in FIG. 3, the motor 15 is mounted to one wall portion 14a of opposite walls of the arm 14 in the inner space of the arm 14. Further, other wall portion 14b of the arm 14 is formed with an opening portion 14c, and a hollow bearing 16 is located in the opening portion 14c. A cylindrical hollow shaft portion 10a is inserted in the hollow bearing 16. The hollow shaft portion 10a is formed in the housing 10, and the center axis of the hollow shaft portion 10a is coincident with the swing axis X of the arm 14. Further, the inner diameter of the hollow shaft portion 10a is made to be larger than the outer diameter of the motor 15 such that the motor 15 is allowed to pass into the hollow shaft portion 10a, thereby making it possible to mount or exchange the motor 15. Thus, as the outer diameter of the motor 15 increases, it is necessary to increase the inner diameter D of the hollow portion of the hollow shaft portion 10a and the size of the hollow bearing 16 as well.

Generally, the cost of the hollow bearing increases as the bearing size increases. In the case of a wrist joint of a robot as disclosed in Japanese Patent Laid-open Publication No. Hei8-141968, the outer diameter of the motor to drive the joint axis becomes relatively small so that the size of the hollow bearing may be relatively small.

However, for a joint such as elbow joint or shoulder joint to which a larger load is applied than that applied to the wrist joint, it is necessary to use a motor larger than that for the wrist joint. Consequently, the size of the hollow bearing increases, and thus the cost of the hollow bearing also increases. Such a problem arises when the joint structure disclosed in Japanese Patent Laid-open Publication No. H08-141968 is applied to a joint other than the wrist joint of a robot.

FIG. 4 is a perspective view illustrating a vertically articulated robot. As illustrated in FIG. 4, a hand 41 for gripping a work W is mounted on a distal end of an arm of the vertical articulated robot. The joints of the arm may include a wrist joint 42, an elbow joint 43, and a shoulder joint 44. The motor to drive the joint axis of the elbow joint 43, the shoulder joint 44 or the like often becomes larger as compared with the motor to drive the joint axis of the wrist joint 42.

In order to avoid the above-mentioned problem of cost, a joint structure has been proposed in which the U-shaped housing 10 is formed of two components so as to be splittable. FIG. 5 is a sectional view of a joint structure including such splittable U-shaped housing 10. Meanwhile, in FIG. 5, components same as those illustrated in FIG. 3 are denoted by the same reference numerals.

Referring to FIG. 5, the U-shaped housing 10 is formed of a first L-shaped component 11 and a second I-shaped component 12 which are tightened together by bolts 13. The first component 11 and the second component 12 are disposed in opposing relationship to each other with the arm 14 being held therebetween, and support the arm 14 about the swing axis X. In particular, the second component 12 is formed with a cylindrical hollow shaft portions 12a. The hollow shaft portion 12a is inserted in the hollow bearing 16 existing in an opening portion 14c of other wall portion 14b of the arm 14. Further, the center axis of the hollow shaft portion 12a is coincident with the swing axis X of the arm 14.

With such structure, it is possible to remove the second component 12 from the first component 11 by loosening the bolts 13. Upon removal of the second component 12, the hollow bearing 16 can also be removed from the opening portion 14c of the arm 14. As such, it becomes possible to mount or exchange the motor 15 from the opening portion 14c merely by making the inner diameter of the opening portion 14c larger than the outer diameter of the motor 15.

In other words, with the prior art joint structure illustrated in FIG. 5, there is no need to make the inner diameter of the hollow bearing 16 and the hollow shaft portion 12a lager than the outer diameter of the motor 15. Thus, it is possible to determine the size of the hollow bearing 16 without depending on the outer diameter of the motor 15.

However, the outer shell of a robot is generally formed of a casting material. As such, the housing 10 is formed by combining the first component 11 and the second component 12, each of which is formed of a casting material, by the bolts 13. With such structure, the rigidity of the housing 10 is decreased as compared with a structure in which the housing 10 is entirely formed of a single cast component.

Further, since the housing 10 is formed by combining the first component 11 and the second component 12 with each other, a problem also arises that split line increases on the outer shell surface of the robot so that the appearance of the robot is deteriorated.

As above, in the joint structure for the robot disclosed in Japanese Patent Laid-open Publication No. H08-141968, there is a problem that the cost of the hollow bearing will increase as the outer diameter of the motor increases. In order to avoid this problem, there is a structure in which the U-shaped housing that supports the arm at both ends is formed of two components so as to be splittable as illustrated in FIG. 5. However, in this structure, there is a problem that the rigidity of the housing and the appearance of the robot are deteriorated.

SUMMARY OF THE INVENTION

The present invention provides a joint structure for a robot in which the the rigidity of a housing that swingably supports an arm and the appearance of the robot are not deteriorated and no cost increase is caused in spite of an increase in the outer diameter of a motor.

According to a first aspect of the present invention, there is provided a joint structure for a robot, which includes:

a hollow-structured arm;

a U-shaped housing that forms a pair of support portions disposed in opposing relationship to each other with the arm being held therebetween, the housing supporting the arm swingably about a swing axis by the pair of support portions;

a motor accommodated in an inner space of the arm and fixed to one wall portion of the arm adjacent to one support portion of the pair of support portions, wherein the motor causes the arm to be swung about the swing axis with respect to the one support portion;

a hollow bearing inserted in a first opening portion formed in other wall portion of the arm adjacent to other support portion of the pair of support portions, wherein a center axis of the hollow bearing is coincident with the swing axis; and a hollow shaft portion that supports an inner ring of the hollow bearing inserted in the first opening portion, wherein:

the hollow shaft portion is removably fixed with respect to a wall portion of the housing which is adjacent to other wall portion of the arm and forms the other support portion, and the wall portion is formed with a second opening portion that allows the hollow bearing and the motor to pass therethrough, the first opening portion is formed such that the motor is allowed to pass therethrough, and a hollow portion of the hollow shaft portion is formed to be smaller than the motor.

According to a second aspect of the present invention, there is provided a joint structure for a robot in which the joint structure for the robot according to the first aspect further includes a bearing adapter formed with a third opening portion, wherein the bearing adapter is inserted in the first opening portion and removably fixed to the arm, and wherein the hollow bearing is inserted in the third opening portion, and the second opening portion is formed such that the hollow bearing, the motor, and the bearing adapter are allowed to pass therethrough.

According to a third aspect of the present invention, there is provided a joint structure for a robot in which the joint structure for the robot according to the first or second aspect further includes a speed reducer that reduces the rotational speed of the motor, wherein the speed reducer is accommodated in an inner space of the housing and fixed to one wall portion of the arm, and wherein each axis of rotation of the motor and the speed reducer is located on an axis same as the swing axis.

According to a fourth aspect of the present invention, there is provided a joint structure for a robot in which the housing is formed of a single component in the joint structure for the motor according to any one of the first to third aspects.

These objects, features and advantages, as well as other objects, features, and advantages, of the present invention will become apparent from a detailed description of exemplary embodiments of the present invention illustrated in the accompanying drawings.

DETAILED DESCRIPTION

Figure 1:
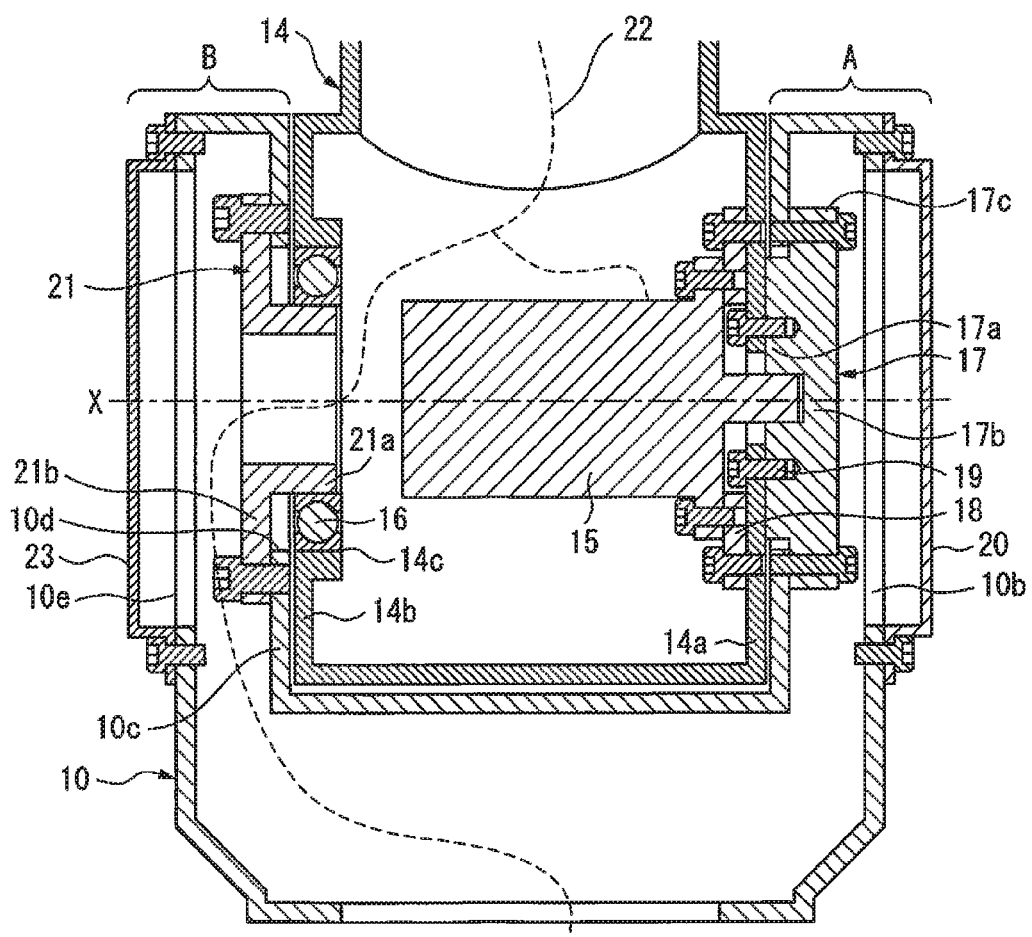
FIG. 1 is a sectional view illustrating a joint structure for a robot according to a first embodiment.

Description will now be made of embodiments of the present invention with reference to the drawings. In the accompanying drawings, like members are denoted by like reference numerals. In order to facilitate understanding, the scale of the drawings is changed arbitrarily. Further, components same as those of the prior art joint structure illustrated in FIG. 5 will be described using the same reference numerals.

First Embodiment

FIG. 1 is a sectional view illustrating the joint structure for the robot according to the first embodiment.

As illustrated in FIG. 1, the joint structure for the robot according to the first embodiment includes a hollow-structure arm 14, and a U-shaped housing 10 which forms a pair of support portions A and B disposed in opposing relationship to each other with one end portion of the arm 14 being held therebetween. The housing 10 swingably supports the arm 14 by the pair of such support portions A and B.

In the inner space of the housing 10 and the arm 14 is accommodated a rotating device that causes the arm 14 to be swung. As the rotating device, there are provided a motor 15 and a speed reducer 17 such as illustrated in FIG. 1.

As illustrated in FIG. 1, the motor 15 is accommodated in the inner space of the arm 14 and mounted to one wall portion 14a of opposite walls of the arm 14. More specifically, an annular adapter 18 is fixed by bolts to one surface of the wall portion 14a which faces the inner space of the arm 14, and the motor 15 is fixed on the adapter 18 by bolts. The wall portion 14a of the arm 14 is a wall portion adjacent to one support portion A of the pair of support portions A and B of the U-shaped housing 10.

To the other surface of the wall portion 14a is fixed the speed reducer 17. As the speed reducer 17, use may be made of a planetary gear reducer, a cyclo (registered trademark) speed reducer, a wave gear device or the like. Such speed reducer 17 is configured of an output portion 17a, an input portion 17b, and a fixed portion 17c. In FIG. 1, each form of the output portion 17a, the input portion 17b, and the fixed portion 17c of the speed reducer 17 is illustrated schematically.

The output portion 17a of the speed reducer 17 is fixed to the other surface of the wall portion 14a by a bolt. To the input portion 17b of the speed reducer 17 is inputted the output of the motor 15, so that the number of rotation of the motor 15 is transmitted to the speed reducer 17. The fixed portion 17c of the speed reducer 17 is fixed to the inner surface of the housing 10 by a bolt.

In the above-described configuration, when the motor 15 is rotated, the rotational speed of the motor 15 is reduced by the speed reducer 17 and transmitted to the arm 14. In this manner, the arm 14 is swung about a swing axis X with respect to the housing 10.

Meanwhile, the reason that the motor 15 is fixed on the adapter 18 is to prevent mutual interference between the motor 15 and the bolt 19 by which the output portion 17a of the speed reducer 17 is fixed to the wall portion 14a of the arm 14. As such, the thickness of the adapter 18 is larger than that of the head of the bolt 19. The shape of the adapter 18 is not limited to an annular shape but may be any shape that is capable of achieving the purpose to prevent the motor 15 from interfering with the bolt 19.

Further, each axis of rotation of the motor 15 and the speed reducer 17 is located on an axis same as the swing axis X of the arm 14. With such an arrangement, it is possible to minimize the number of components of a power transmission mechanism that transmits the power of the motor 15 to the arm 14.

One support portion A of the housing 10 is formed with an opening portion 10b which allows the speed reducer 17 to pass therethrough, and the opening portion 10b is closed by a first cover 20.

Further, an opening portion 14c is formed in the other wall portion 14b of the arm 14 which is adjacent to other support portion B (i.e., the wall portion 14b opposite to the wall portion 14a to which are fixed the motor 15 and the speed reducer 17). In the opening portion 14c, there is mounted a hollow bearing 16 by a bearing mounting member 21.

The bearing mounting member 21 includes a hollow shaft portion 21a that supports an inner ring of the hollow bearing 16, and a flange portion 21b that removably fixes the bearing mounting member 21 to the housing 10.

The bearing mounting member 21 is located in the inner space of the housing 10. The flange portion 21b is removably fixed to the wall portion 10c of the housing 10 which is adjacent to the other wall portion 14b of the arm 14 and forms the other support portion B. In particular, the flange portion 21b is fixed to the inner wall surface of the housing 10 by a bolt in a manner such that each center axis of the hollow bearing 16 and the hollow shaft portion 21a is coincident with the swing axis X of the arm 14.

Further, the hollow shaft portion 21a has a predetermined axial length such that the hollow bearing 16 supported by the hollow shaft portion 21a is accommodated in the opening portion 14c in a state in which the flange portion 21b is fixed to the inner wall surface of the housing 10 as described above. In the wall portion 10c of the housing 10 to which the flange portion 21b is fixed, there is formed an opening portion 10d that allows the hollow bearing 16 supported by the hollow shaft portion 21a to pass therethrough. With the above configuration, the arm 14 becomes swingable with respect to the housing 10 about the swing axis X via the hollow bearing 16.

Meanwhile, the hollow bearing 16 illustrated in FIG. 1 is depicted as being in the form of a rolling bearing, but in the present invention, a plain bearing may be used as the hollow bearing 16.

Further, the outer ring of the hollow bearing 16 and the inner circumferential surface of the opening portion 14c of the arm 14 are loosely coupled to each other via clearance fit. Meanwhile, the inner ring of the hollow bearing 16 and the hollow shaft portion 21a of the bearing mounting member 21 are tightly coupled to each other via interference fit. Thus, when the bearing mounting member 21 is removed from the wall portion 10c of the housing 10, the hollow bearing 16 is also removed from the opening portion 14c of the arm 14 along with the bearing mounting member 21. Further, in the present embodiment, the opening portion 14c of the arm 14 is formed such that the motor 15 is allowed to pass therethrough, and the opening portion 10d of the housing 10 is formed such that the motor 15 and the hollow bearing 16 are allowed to pass therethrough. In this manner, the outer diameter of the hollow bearing 16 may be of such a size that allows the hollow bearing 16 to be fitted in the opening portion 14c having a minimum necessary inner diameter to allow the motor 15 to pass therethrough. In other words, in the present invention, the inner diameter of the hollow bearing 16 can be set to be smaller than that of the motor 15; thus, the hollow portion of the hollow shaft portion 21a is formed to be smaller than the motor 15.

Figure 3:
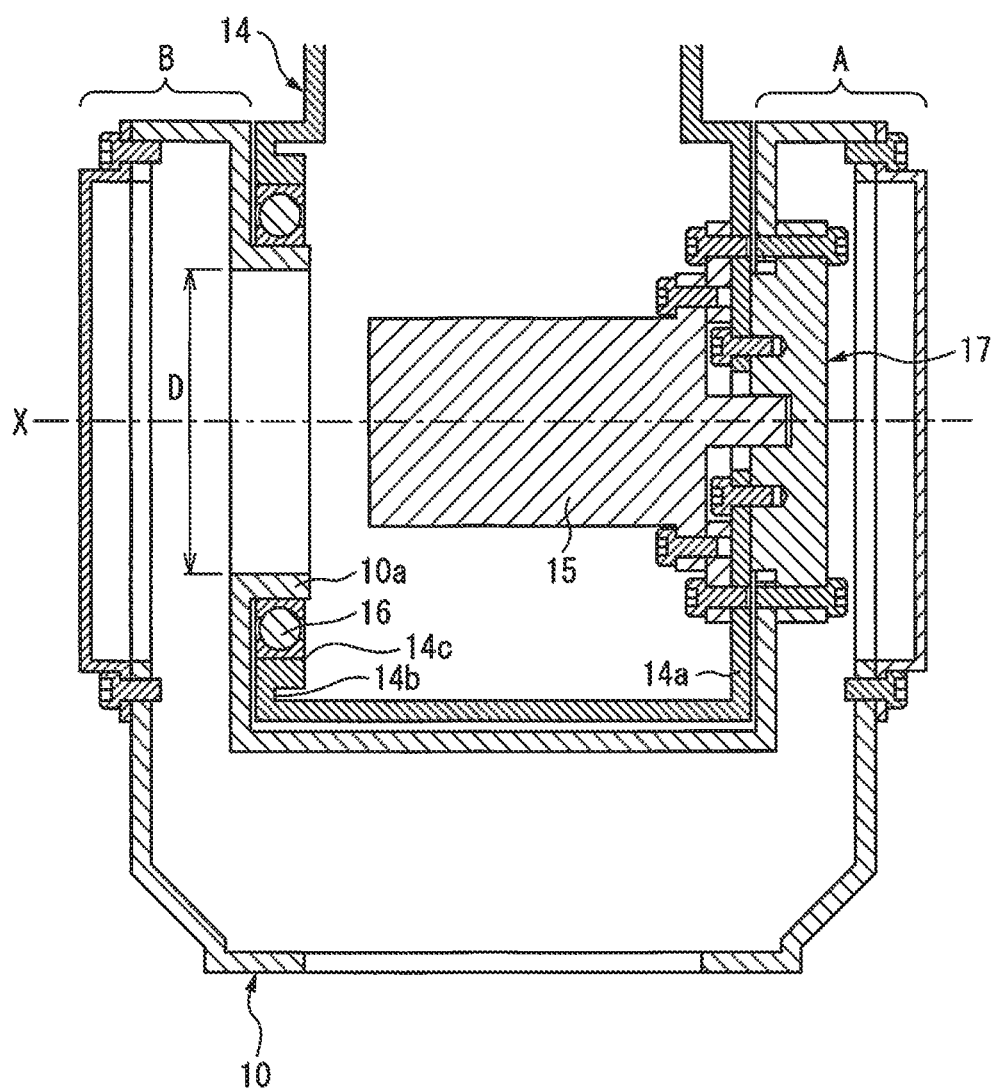
FIG. 3 is a sectional view of a prior art joint structure for a robot.
Figure 4:
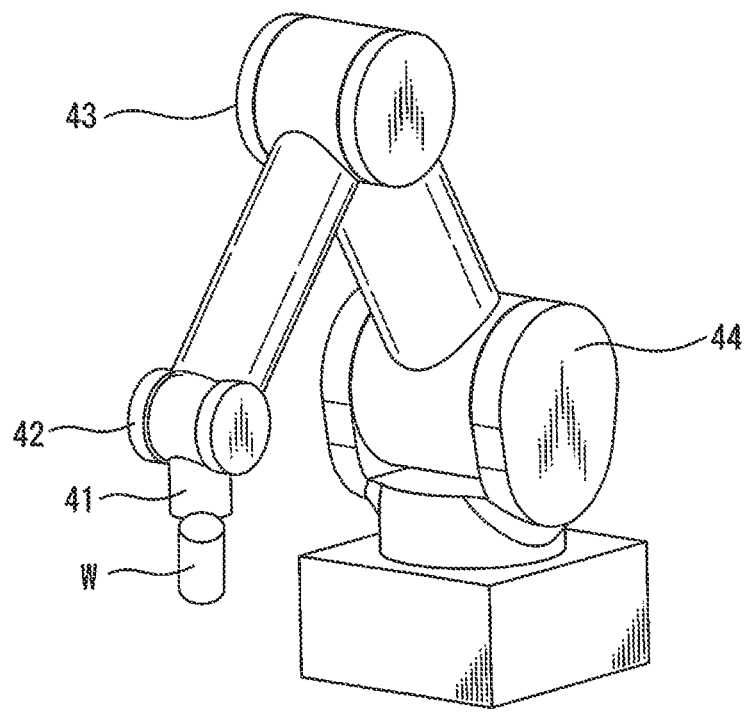
FIG. 4 is a perspective view of a general vertical articulated robot.

Therefore, according to the first embodiment described above, a smaller size hollow bearing can be selected as the hollow bearing 16, as compared with the joint structure (refer to FIG. 3) in which it is necessary to pass the motor 15 through the hollow portion of the hollow shaft portion 21a when mounting or exchanging the motor 15. Consequently, it is possible to reduce the cost of the bearing required for the joint structure of the robot as well as the cost of the robot.

In addition, it is also possible to decrease the volume of the hollow portion of the hollow shaft portion 21a, thereby enhancing the rigidity of the joint shaft since there is no need to pass the motor 15 through the hollow portion of the hollow shaft portion 21a when mounting or exchanging the motor 15. Meanwhile, in the first embodiment, a cable 22 (represented by dotted line in the drawing) for driving the motor 15 is extended through the hollow portion of the hollow shaft portion 21a of the bearing mounting member 21.

Further, the other support portion B of the housing 10 is formed with an opening portion 10e through which the motor 15, the hollow bearing 16, and the bearing mounting member 21 are allowed to pass, and the opening portion 10e is closed by a second cover 23. In this manner, it becomes possible to mount the motor 15, the hollow bearing 16, and the bearing mounting member 21 to the arm 14 by passing them through the housing 10.

Figure 5:
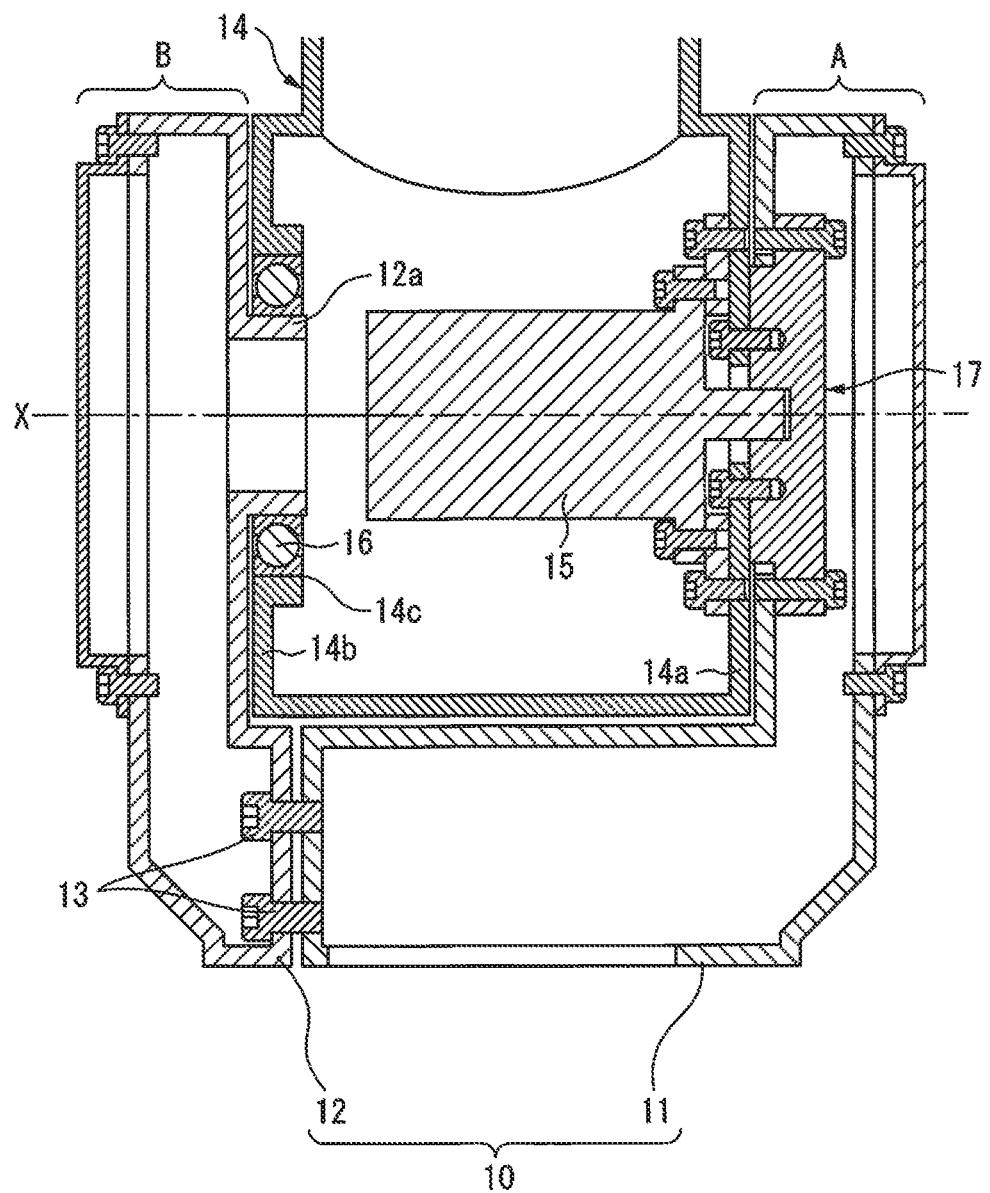
FIG. 5 is a sectional view illustrating other example of prior art joint structure for a robot.

Further, according to the first embodiment, there is also no need to form the U-shaped housing 10 of two cast components in order to make it splittable as in the prior art joint structure illustrated in FIG. 5. In other words, the U-shaped housing 10 according to the first embodiment is formed of a single cast component. Thus, as compared with the prior art joint structure (FIG. 5), it is possible to enhance the rigidity of the housing 10, while at the same time avoiding deterioration of the appearance of the robot.

Second Embodiment

Description will now be made of a modification to the above-described embodiment. Components same as those of the first embodiment are denoted by the same reference numerals, and points different from the first embodiment will be mainly described.

Figure 2:
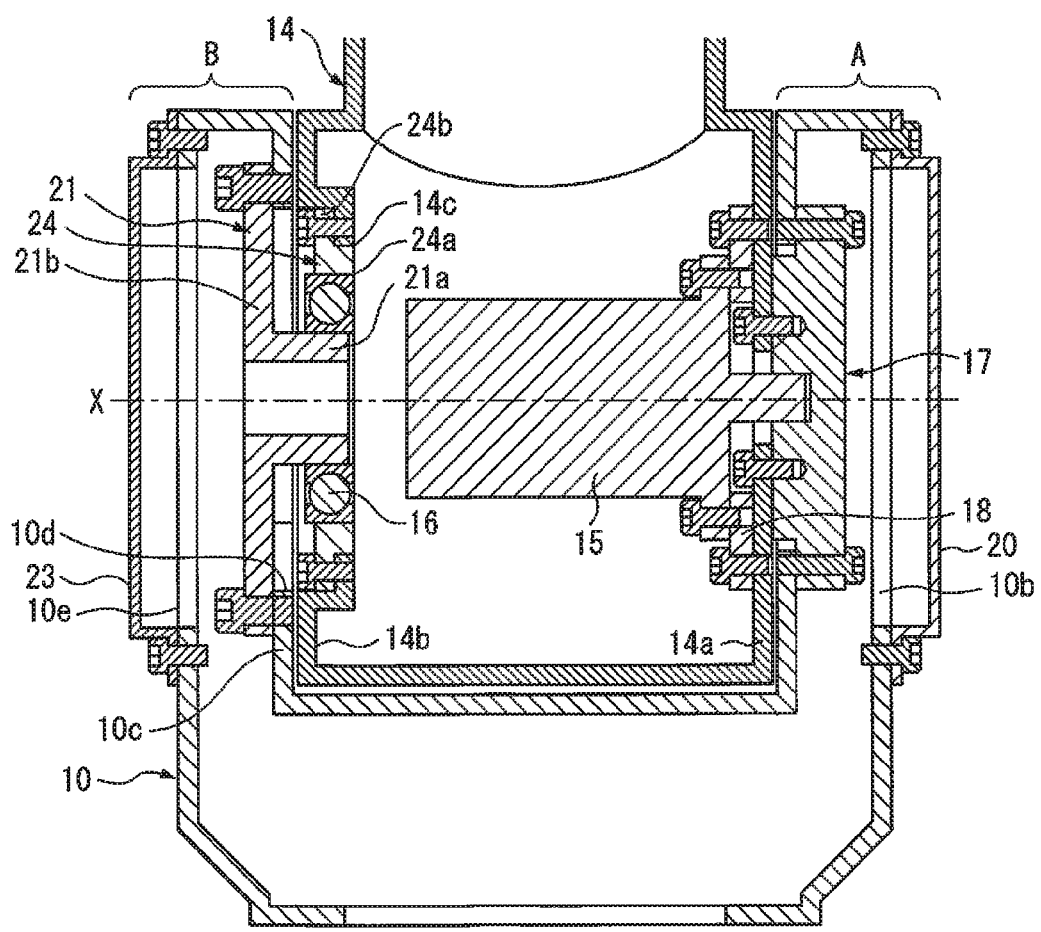
FIG. 2 is a sectional view illustrating a joint structure for a robot according to a second embodiment.

FIG. 2 is a sectional view illustrating a joint structure for a robot according to the second embodiment.

In the second embodiment, as illustrated in FIG. 2, an annular bearing adapter 24 is provided between the hollow bearing 16 and the arm 14. The bearing adapter 24 is formed with an opening portion 24a to be fitted with hollow bearing 16. In addition, the bearing adapter 24 is formed with a flange portion 24b for securing the bearing adapter 24 to the circumferential portion of the opening portion 14c of the arm 14 by bolts.

Further, the outer ring of the hollow bearing 16 and the inner circumferential surface of the opening portion 24a of the bearing adapter 24 are loosely coupled to each other via clearance fit. Meanwhile, the inner ring of the hollow bearing 16 and the hollow shaft portion 21a of the bearing mounting member 21 are tightly coupled to each other via interference fit. As such, when the bearing mounting member 21 is removed from the wall portion 10c of the housing 10, it becomes that the hollow bearing 16 is also removed from the opening portion 24a of the bearing adapter 24 along with the bearing mounting member 21. Further, in the present embodiment, the opening portion 14c of the arm 14 is formed such that the motor 15 is allowed to pass therethrough, and the opening portion 10d of the housing 10 is formed such that the motor 15, the hollow bearing 16, and the bearing adapter 24 are allowed to pass therethrough.

In the first embodiment (FIG. 1) described above, it is required that the outer ring of the hollow bearing 16 and the opening portion 14c formed such that the motor 15 is allowed to pass therethrough be fitted with each other. In contrast, in the second embodiment illustrated in FIG. 2, it is only required that the outer ring of the hollow bearing 16 and the bearing adapter 24 be fitted with each other. In other words, the outer diameter of the hollow bearing 16 may be a size that allows the hollow bearing 16 to be fitted into the opening portion 24c of the bearing adapter 24 inserted in the opening portion 14c having a minimum necessary inner diameter to allow the motor 15 to pass therethrough.

Thus, according to the second embodiment, a smaller size hollow bearing can be selected as the hollow bearing 16, as compared with the joint structure of the first embodiment (FIG. 1). Consequently, it is possible to reduce the cost of the bearing required for the joint structure of the robot as well as the cost of the robot.

Further, there is no need to form the U-shaped housing 10 of two cast components to make it splittable as in the prior art joint structure illustrated in FIG. 5. Since the U-shaped housing 10 can be formed of a single cast component, there does not arise a problem that the rigidity of the housing 10 and the appearance of the robot are deteriorated.

Advantage of the Invention

According to the first embodiment of the present invention, a pair of support portions are formed by a U-shaped housing and disposed in opposing relationship to each other with an arm, in which a motor is accommodated, being held therebetween, and the arm is swingably supported by the pair of support portions. A first opening portion is formed in other wall portion of the arm which is adjacent to other support portion of such a pair of support portions, and a hollow bearing is inserted in the first opening portion. The inner ring of the hollow bearing is supported by a hollow shaft portion, and the hollow shaft portion is removably fixed to a wall portion of the housing which is adjacent to the other wall portion of the arm and forms the other support portion.

The wall portion of the housing which forms the other support portion is formed with a second opening portion which allows the hollow bearing and the motor to pass therethrough, and the first opening portion is formed such that the motor is allowed to pass therethrough. In the present invention, the hollow portion of the hollow shaft portion is formed to be smaller than the motor so that the motor in the housing cannot be removed through the hollow portion of the hollow shaft portion but the hollow shaft portion is attachable to and detachable from the wall portion of the housing. Thus, by removing the hollow shaft portion from the wall portion of the housing, it is possible to remove the hollow bearing in the first opening portion through the second opening portion, and it is also possible to remove the motor in the arm from the arm through the first opening portion and the second opening portion.

Since the hollow shaft portion is thus configured to be attachable and detachable, the outer diameter of the hollow bearing may be a size that allows the hollow bearing to be fitted into the first opening portion having a minimum necessary inner diameter to allow the motor to pass therethrough. In other words, the inner diameter of the inner ring of the hollow bearing and that of the hollow portion of the hollow shaft portion may be smaller than the outer diameter of the motor.

Thus, according to the first embodiment, a smaller size hollow bearing can be selected, as compared with the joint structure (see FIG. 3) in which it is necessary to pass the motor through the hollow portion of the hollow shaft portion when mounting or exchanging the motor. Consequently, it is possible to reduce the cost of the bearing required for the joint structure for the robot as well as the cost of the robot.

Further, according to the first aspect of the present invention, it becomes not necessary to form the U-shaped housing of two cast components to make it splittable as in the prior art joint structure illustrated in FIG. 5. In other words, the U-shaped housing can be formed of a single cast component. Thus, it is possible to reduce the cost of the robot without decreasing the rigidity of the housing and deteriorating the appearance of the robot, in contrast to the prior art joint structure illustrated in FIG. 5.

Further, according to the second aspect of the present invention, the joint structure for the robot according to the first embodiment is further provided with a bearing adapter formed with a third opening portion. The bearing adapter is inserted in the first opening portion, and removably fixed to the other wall portion of the arm. Further, the hollow bearing is inserted in the third opening portion, and the second opening portion is formed such that the hollow bearing, the motor, and the bearing adapter are allowed to pass therethrough. Since the bearing adapter is thus provided between the first opening portion and the hollow bearing, the outer diameter of the hollow bearing may be a size that allows the hollow bearing to be fitted into the third opening portion of the bearing adapter inserted in the first opening portion having a minimum necessary inner diameter to allow the motor to pass therethrough.

Thus, according to the second aspect, as compared with the first aspect, a smaller size hollow bearing can be selected so that the cost of the robot can be further reduced.

Further, according to the third aspect of the present invention, in the joint structure for the robot in which the motor is accommodated and fixed in the arm and a speed reducer that reduces the rotational speed of the motor is accommodated and fixed in the housing, each axis of rotation of the motor and the speed reducer is located on an axis same as the swing axis of the arm. By arranging the motor and the speed reducer in this manner, it is possible to minimize the number of components of a power transmission mechanism that transmits power of the motor to the arm.

Further, according to the fourth aspect of the present invention, the U-shaped housing that swingably supports the arm is formed of a single component. In this manner, it is possible to prevent the rigidity of the housing from being decreased and the appearance of the robot from being deteriorated, as compared with a case in which the U-shaped housing is formed of a combination of a plurality of cast components.

While, in the foregoing, exemplary embodiments of the present invention have been illustrated, the present invention is not limited to the above-described embodiments, and the above-described embodiments may be changed to various forms, structures, and materials in a scope without departing from the idea of the present invention. Accordingly, the present invention is applicable not only to a joint axis of a robot but also to any structure including a housing that accommodates a motor, and a shaft portion that supports a bearing.

What is claimed is:

1. A joint structure for a robot, the joint structure comprising:
   a hollow-structured arm;
   a U-shaped housing that forms a pair of support portions disposed in opposing relationship to each other with the arm being held therebetween, the housing supporting the arm swingably about a swing axis by the pair of support portions, wherein the U-shaped housing is formed as a single component;
   a motor having an outer main housing extending substantially along the entire length of the motor and accommodated in an inner space of the arm and fixed to a first wall portion of the arm which is adjacent to a first support portion of the pair of support portions, wherein the motor causes the arm to be swung about the swing axis with respect to the first support portion;
   a hollow bearing inserted in a first opening portion formed in a second wall portion of the arm which is adjacent to a second support portion of the pair of support portions, wherein a center axis of the hollow bearing is coincident with the swing axis; and
   a hollow shaft portion that supports an inner ring of the hollow bearing inserted in the first opening portion,
   wherein:
      the hollow shaft portion is removably fixed to a wall portion of the housing forming the second support portion adjacent to the second wall portion of the arm, and the wall portion of the housing is formed with a second opening portion that allows the hollow bearing and the motor to pass therethrough,
      the first opening portion is formed such that the motor is allowed to pass therethrough, and
      a hollow portion of the hollow shaft portion has an inner diameter which is smaller than an outer diameter of the main housing of the motor.

2. The joint structure for the robot according to claim 1, further comprising:
   a speed reducer that reduces a rotational speed of the rotor, the speed reducer being accommodated in an inner space of the housing and fixed to the first wall portion of the arm,
      wherein each axis of rotation of the motor and the speed reducer is located on an axis same as the swing axis.

3. The joint structure for the robot according to claim 1, wherein
   the hollow shaft portion has an axial length which allows the hollow bearing to be accommodated in the first opening portion.

4. The joint structure for the robot according to claim 1, wherein
   an outer ring of the hollow bearing and an inner circumferential surface of the first opening portion of the arm are loosely coupled to each other via clearance fit, and
   the inner ring of the hollow bearing and the hollow shaft portion are tightly coupled to each other via interference fit.

5. A joint structure for a robot, the joint structure comprising:
   a hollow-structured arm;
   a U-shaped housing that forms a pair of support portions disposed in opposing relationship to each other with the arm being held therebetween, the housing supporting the arm swingably about a swing axis by the pair of support portions;
   a motor accommodated in an inner space of the arm and fixed to a first wall portion of the arm which is adjacent to a first support portion of the pair of support portions, wherein the motor causes the arm to be swung about the swing axis with respect to the first support portion;
   a hollow bearing inserted in a first opening portion formed in a second wall portion of the arm which is adjacent to a second support portion of the pair of support portions, wherein a center axis of the hollow bearing is coincident with the swing axis; and
   a hollow shaft portion that supports an inner ring of the hollow bearing inserted in the first opening portion,
   wherein:
      the hollow shaft portion is removably fixed to a wall portion of the housing forming the second support portion adjacent to the second wall portion of the arm, and the wall portion of the housing is formed with a second opening portion that allows the hollow bearing and the motor to pass therethrough,
      the first opening portion is formed such that the motor is allowed to pass therethrough, and
      a hollow portion of the hollow shaft portion has an inner diameter which is smaller than an outer diameter of the motor,
   the joint structure further comprising:
   a bearing adapter formed with a third opening portion,
      wherein:
         the bearing adapter is inserted in the first opening portion and removably fixed with respect to the second wall portion of the arm,
         the hollow bearing is inserted in the third opening portion, and
         the second opening portion is formed such that the hollow bearing, the motor, and the bearing adapter are allowed to pass therethrough.

6. A joint structure for a robot, the joint structure comprising:
   a hollow-structured arm;
   a U-shaped housing that forms a pair of support portions disposed in opposing relationship to each other with the arm being held therebetween, the housing supporting the arm swingably about a swing axis by the pair of support portions;
   a motor accommodated in an inner space of the arm and fixed to a first wall portion of the arm which is adjacent to a first support portion of the pair of support portions, wherein the motor causes the arm to be swung about the swing axis with respect to the first support portion;
   a hollow bearing inserted in a first opening portion formed in a second wall portion of the arm which is adjacent to a second support portion of the pair of support portions, wherein a center axis of the hollow bearing is coincident with the swing axis; and a hollow shaft portion that supports an inner ring of the hollow bearing inserted in the first opening portion, wherein:

the hollow shaft portion is removably fixed to a wall portion of the housing forming the second support portion adjacent to the second wall portion of the arm, and the wall portion of the housing is formed with a second opening portion that allows the hollow bearing and the motor to pass therethrough, the first opening portion is formed such that the motor is allowed to pass therethrough, and a hollow portion of the hollow shaft portion has an inner diameter which is smaller than an outer diameter of the motor, the joint structure further comprising:

a speed reducer that reduces a rotational speed of the rotor, the speed reducer being accommodated in an inner space of the housing and fixed to the first wall portion of the arm, wherein each axis of rotation of the motor and the speed reducer is located on an axis same as the swing axis; and an annular adapter fixed to an inner surface of the first wall portion, the inner surface facing the inner space of the arm, wherein the motor is fixed on the annular adapter, an output portion of the speed reducer is arranged on an outer surface of the first wall portion, and is fixed by a bolt to the first wall portion, the bolt has a head on the inner surface of the first wall portion, and extends through the first wall portion to engage with the output portion of the speed reducer, and a thickness of the annular adapter is larger than a thickness of the head of the bolt.

* * * * *